United States Patent
Ellerbrok et al.

(12) 
(10) Patent No.: US 6,371,509 B1
(45) Date of Patent: Apr. 16, 2002

(54) GAS BAG FOR A VEHICLE OCCUPANT RESTRAINT SYSTEM

(75) Inventors: Norbert Ellerbrok, Alfdorf; Norbert Lang, Leinzell, both of (DE)

(73) Assignee: TRW Occupant Restraint Systems GmbH & Co. KG, Alfdorf (DE)

(*) Notice: Subject to any disclaimer, the term of this patent is extended or adjusted under 35 U.S.C. 154(b) by 0 days.

(21) Appl. No.: 09/406,073

(22) Filed: Sep. 27, 1999

(30) Foreign Application Priority Data

Sep. 30, 1998 (DE) ..................................... 298 17 504 U (51) Int. Cl.$^7$ ............................................... B60R 21/24
(52) U.S. Cl. ...................... 280/729; 280/743.2; 280/740
(58) Field of Search .............................. 280/729, 743.2, 280/743.1, 740

(56) References Cited

U.S. PATENT DOCUMENTS

| | | | | |
|---|---|---|---|---|
| 5,044,663 A | * | 9/1991 | Seizert | 280/730 |
| 5,172,933 A | * | 12/1992 | Strasser | 280/740 |
| 5,294,148 A | * | 3/1994 | Imai | 280/743 |
| 5,573,270 A | * | 11/1996 | Sogi et al. | 280/740 |
| 5,653,464 A | * | 8/1997 | Breed et al. | 280/743.1 |
| 5,797,621 A | * | 8/1998 | Ono | 280/730.2 |

FOREIGN PATENT DOCUMENTS

| | | | | |
|---|---|---|---|---|
| DE | 4033835 | | 4/1991 | |
| DE | 412659 | | 1/1993 | |
| DE | 9211421 | | 3/1993 | |
| DE | 4308387 | | 9/1993 | |
| EP | 0620139 A1 | * | 10/1994 | B60R/21/20 |
| EP | 0870651 A1 | * | 10/1998 | B60R/21/26 |
| JP | 11291855 A | * | 10/1991 | B60R/21/20 |

* cited by examiner

*Primary Examiner*—Lanna Mai
*Assistant Examiner*—Christopher Buchanan
(74) *Attorney, Agent, or Firm*—Tarolli, Sundheim, Covell Tummino & Szabo L.L.P.

(57) ABSTRACT

A gas bag for a vehicle occupant restraint system comprises an inflation opening and a fabric piece arranged in the interior of the gas bag opposite the inflation opening and defining a volume for compressed gas introduced into the gas bag through the inflation opening. The fabric piece forms at least one outflow opening for the compressed gas. The outflow opening defines a gas exit area affected by the compressed gas flowing through the outflow opening, and comprising at least one limiting strap arranged in the interior of the gas bag but outside of the gas exit area.

2 Claims, 9 Drawing Sheets

GAS BAG FOR A VEHICLE OCCUPANT RESTRAINT SYSTEM

BACKGROUND OF THE INVENTION

The invention relates to a gas bag for a vehicle occupant restraint system.

Conventional gas bags comprise an inflation opening, a fabric piece which is arranged inside the gas bag opposite the inflation opening and forms an outflow opening for compressed gas which flows into the gas bag through the inflation opening, and at least one limiting strap which is likewise arranged inside the gas bag.

The fabric piece serves to deflect in a desired direction the hot compressed gas entering into the interior of the gas bag after a gas generator has been activated. This prevents the hot compressed gas from striking directly onto the wall of the gas bag and damaging it. In addition, through the specific deflection of the compressed gas, the unfolding behavior of the gas bag can be influenced to a large extent. According to the direction of inflow of the compressed gas into the gas bag, for example it can be achieved that the gas bag firstly unfolds in lateral direction, in particular upwards and downwards towards the windscreen and towards the floor of the vehicle, and to the vehicle occupant only towards the end of the unfolding process.

The limiting strap serves to influence the shape and the dimensions of the gas bag in particular in the unfolded state. In addition, by means of the limiting strap also the unfolding behavior of the gas bag can be influenced. However, it is a problem that the limiting strap can have a negative effect on the unfolding behavior which is attempted to be maintained by means of the fabric piece.

BRIEF DESCRIPTION OF THE INVENTION

The invention provides a gas bag in which the limiting strap does not have any negative effect on the unfolding behavior of the gas bag, which is predetermined by means of the fabric piece. According to the invention, a gas bag for a vehicle occupant restraint system comprises an inflation opening and a fabric piece arranged in the interior of the gas bag opposite the inflation opening and defining a volume for compressed gas introduced into the gas bag through the inflation opening. The fabric piece forms at least one outflow opening for the compressed gas. The outflow opening defines a gas exit area affected by the compressed gas flowing through the outflow opening, and comprises at least one limiting strap arranged in the interior of the gas bag but outside of the gas exit area. This ensures that the limiting strap does not lie in front of the outflow opening and thereby does not alter in a disadvantageous manner the outflow speed and the outflow direction of the compressed gas from the volume which is delimited by the fabric piece, for example by the opening being covered.

Advantageous embodiments of the invention will be apparent from the sub-claims.

BRIEF DESCRIPTION OF THE DRAWINGS

The invention is described hereinbelow with reference to preferred embodiments which are illustrated in the enclosed drawings, in which.

DETAILED DESCRIPTION OF THE INVENTION

Figure 1:
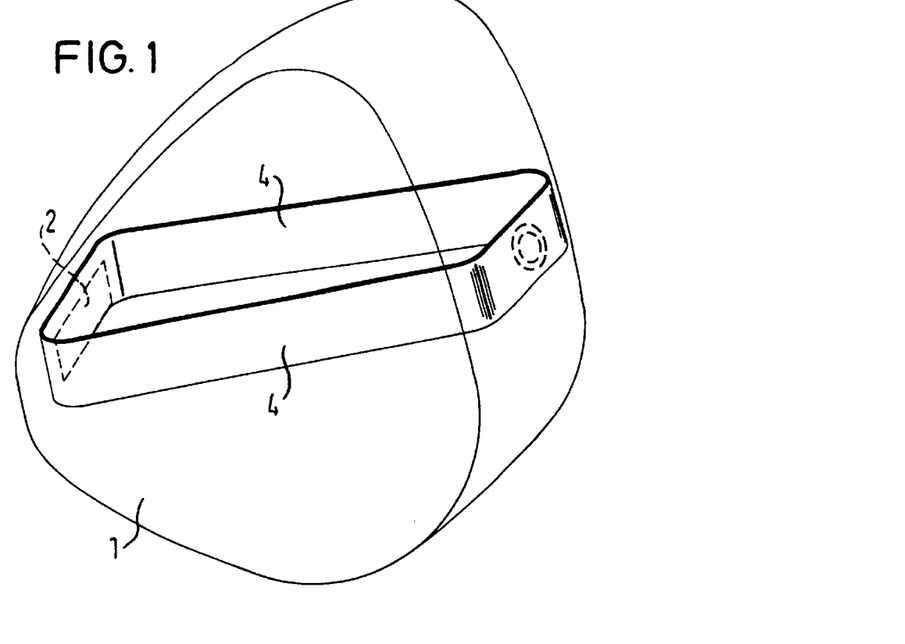
FIG. 1 shows in a perspective view a gas bag with limiting strap.
Figure 2:
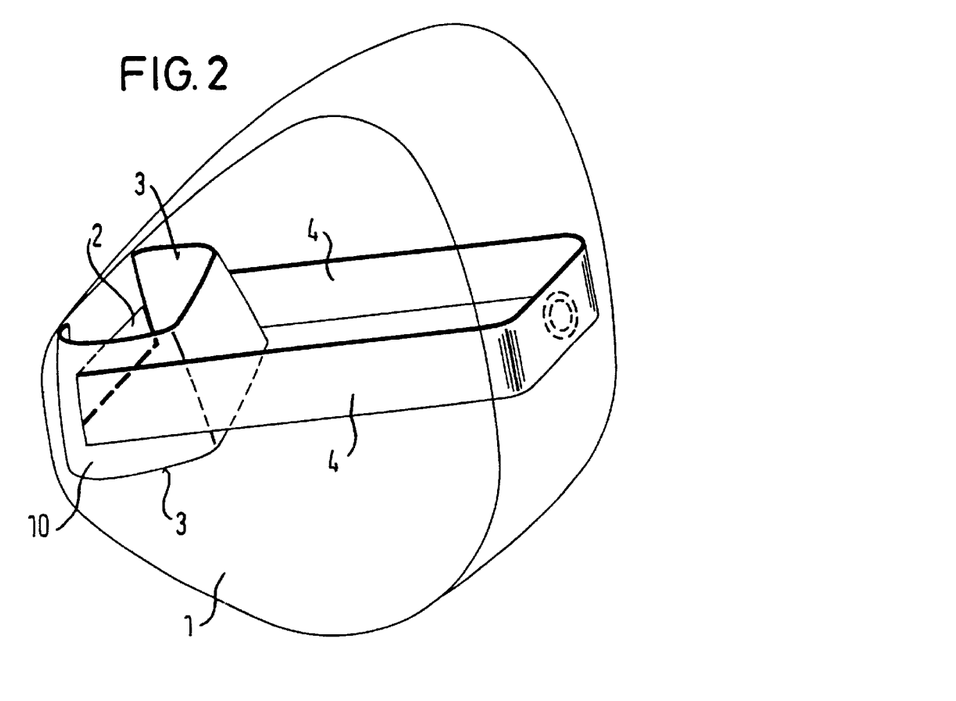
FIG. 2 shows in a perspective view the gas bag of FIG. 1 with limiting strap and fabric piece.

In FIGS. 1 and 2 the basic construction of a gas bag according to the invention can be seen. The gas bag 1 has an inflation opening 2 through which compressed gas can be introduced into the interior of the gas bag, in order to unfold the gas bag.

Inside the gas bag, a fabric piece 10 is arranged such that it forms a type of pre-chamber into which the compressed gas enters which flows through the inflation opening. From this pre-chamber, the compressed gas flows through two outflow openings 3 into the gas bag.

Inside the gas bag in addition two limiting straps 4 are arranged. In this embodiment, these connect the wall region of the gas bag, surrounding the inflation opening, with the region of the wall which faces a vehicle occupant who is to be restrained.

An essential feature consists in that the limiting straps are arranged outside the region in which the compressed gas flows into the gas bag from the pre-chamber. In the embodiment of FIGS. 1 and 2, the limiting straps are arranged laterally on the fabric piece 10, so that they lie in a plane which is perpendicular to the plane in which the central points of the outflow openings 3 lie. Owing to this arrangement, there is also no danger during the unfolding of the gas bag that the limiting straps get in front of the outflow openings 3 and thereby prevent the outflow of the compressed gas from the pre-chamber or have a negative influence thereon. The constructively provided outflow behavior from the pre-chamber is therefore maintained, so that the gas bag unfolds in the desired manner. Provision can be made in particular that the gas bag, owing to the upwardly and downwardly directed outflow openings, firstly unfolds towards the windscreen or towards the vehicle floor and only then towards the vehicle occupant.

Figure 3:
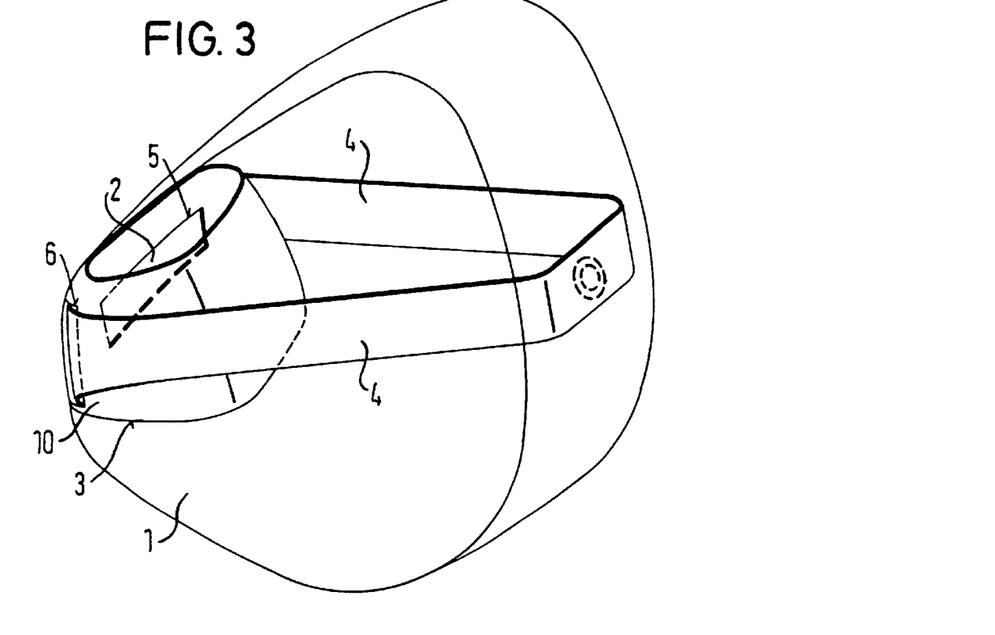
FIG. 3 shows in a perspective view a gas bag with limiting strap and fabric piece, the limiting strap and the fabric piece being constructed in one piece.
Figure 4:
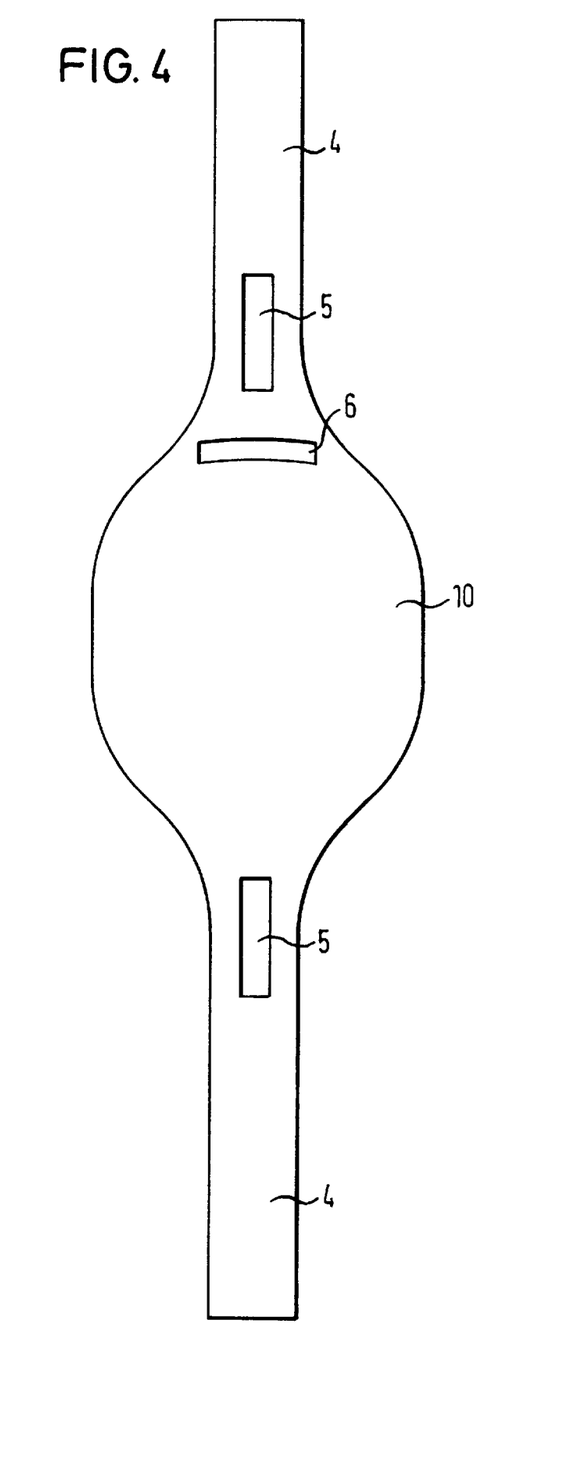
FIG. 4 shows in a top view the blank for the limiting strap and the fabric piece of FIG. 3.

In FIG. 3 a gas bag is shown in which the fabric piece and the limiting straps are constructed in one piece (see also FIG. 4). The limiting straps are arranged on opposite sides of the fabric piece 10. Between the limiting straps and the fabric piece one reinforcement region each is constructed which is provided with a recess 5, the dimensions of which correspond to those of the inflation opening 2. Finally, in the region between a reinforcement region and the fabric piece, an opening 6 is formed which serves for the passage of the limiting strap arranged on the other side.

The limiting straps and the fabric piece run in the following manner. The fabric piece is placed in the manner of a ring so that the two reinforcement regions lie one on the other such that the recesses 5 coincide with the inflation opening. One of the limiting straps extends here through the opening 6. Thus, one limiting strap each protrudes on both sides from the annular fabric piece 10 which forms the pre-chamber. The fabric piece is sewn with the wall region of the gas bag which surrounds the inflation opening, or is connected for example by a holding ring. The free ends of the limiting straps are sewn with the region of the wall of the gas bag which faces a vehicle occupant who is to be restrained.

Figure 5:
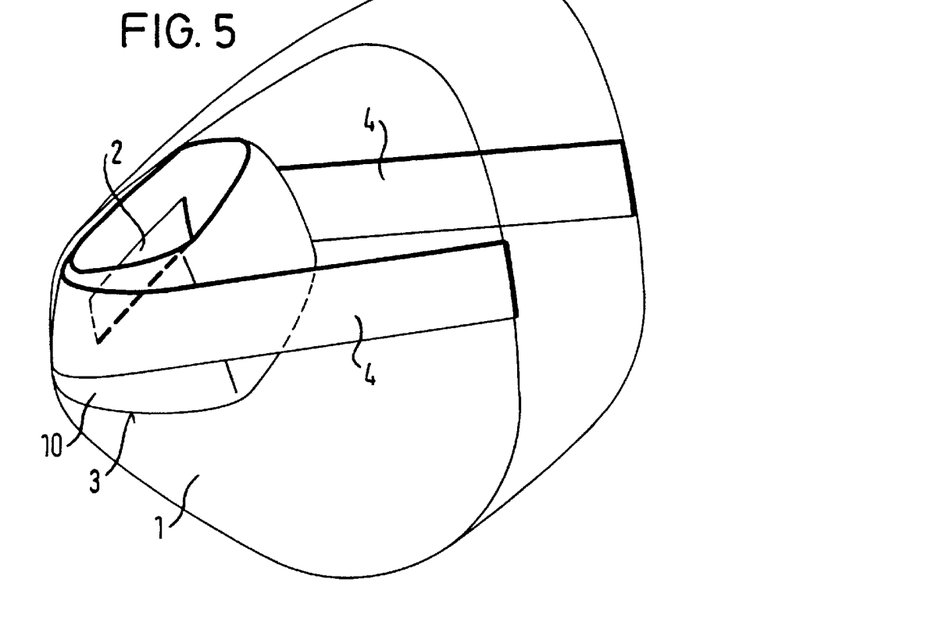
FIG. 5 shows in a perspective view a gas bag with limiting strap and fabric piece according to a modified embodiment.

In FIG. 5 a further embodiment is shown. In contrast to the embodiment according to FIG. 3, the limiting straps are not sewn centrally with the region of the wall of the gas bag which faces a vehicle occupant who is to be restrained, but rather laterally in the region of the seam which connects the side pieces of the wall of the gas bag with the central wall piece.

Figure 6:
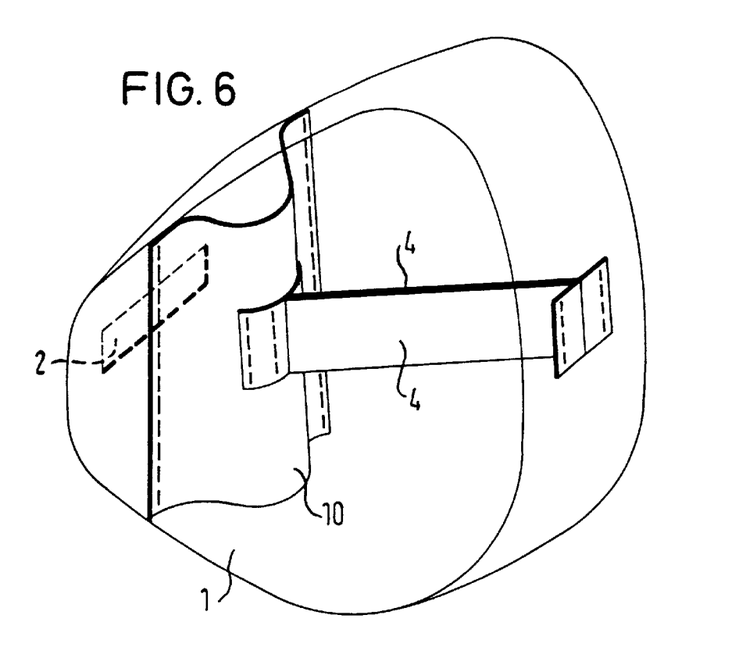
FIG. 6 shows in a perspective view a gas bag with limiting strap and fabric piece according to a further embodiment.
Figure 7:
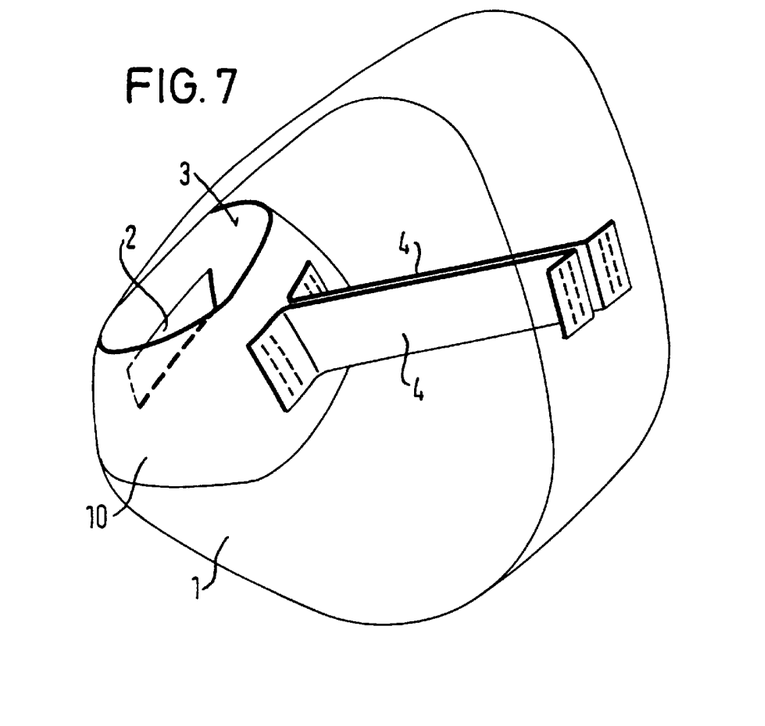
FIG. 7 shows in a perspective view a gas bag with limiting strap and fabric piece according to an additional further embodiment.

In FIGS. 6 and 7, respectively, a further embodiment is shown. In contrast to the preceding embodiments, the limiting straps 4 are not arranged laterally on the fabric piece 10 but rather engage centrally in a region opposite the inflation opening 2 on the fabric piece 10. The fabric piece of FIG. 6 is sewn with its outer edges to the wall of the gas bag. The fabric piece of FIG. 7 has an annular shape, as is known from FIG. 3. In both embodiments, two limiting straps lying adjacent to each other are used, the free ends of which are sewn to the fabric piece 10 and, respectively, to the wall of the gas bag, in opposite directions.

Figure 8:
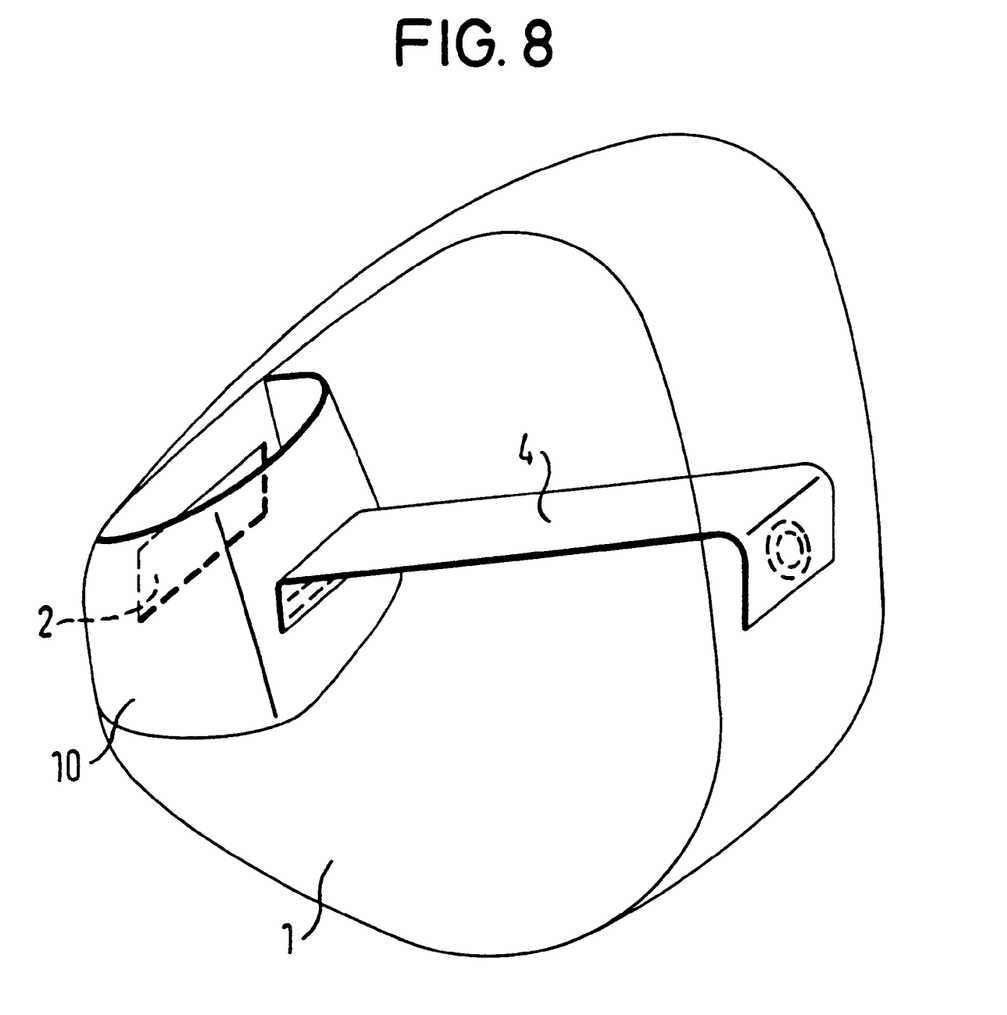
FIG. 8 shows in a perspective view a gas bag with limiting strap and fabric piece according to an alternative embodiment.

In FIG. 8 a variant of the embodiment of FIG. 7 is shown. In this variant, only a single limiting strap 4 is used, which is sewn centrally to the fabric piece 10 in a region lying opposite the inflation opening 2.

Hereinbelow, a particular embodiment of a fabric piece 10 is shown, which can be used together with the limiting straps 4. For better clarity, the limiting straps are no longer shown. However, it can easily be seen that the limiting straps, in an identical manner to that in the preceding embodiments, can be constructed either in one piece with the fabric piece or sewn to the fabric piece.

Figure 9:
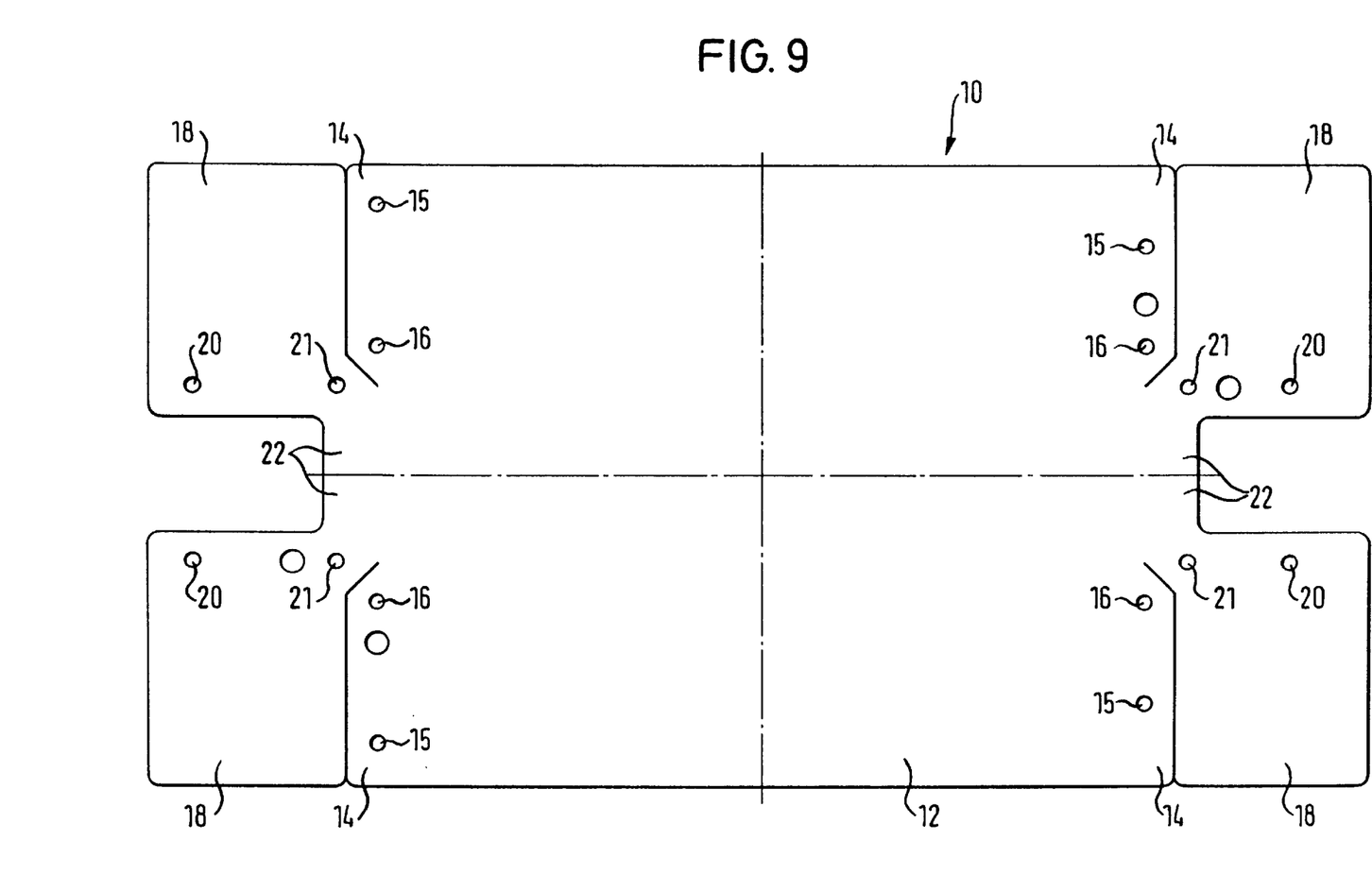
FIG. 9 shows in a top view a blank for a further embodiment of the fabric piece.

In FIG. 9 the fabric piece 10 is shown in the spread out condition, which fabric piece can be cut in one piece from a strip of fabric. The fabric piece 10 contains a central portion 12 which is provided with four fastening portions 14. Each fastening portion 14 extends along one of the shorter outer edges of the central portion 12 starting from a longer outer edge towards the central longitudinal axis, the fastening portions terminating at a distance from the central longitudinal axis. Each fastening portion 14 is provided with two openings 15, 16.

Adjoining each fastening portion 14 a rectangular reinforcement portion 18 is arranged. Each reinforcement portion 18 is provided with two openings 20, 21. The openings 15, 16 arranged in the fastening portion 14 lie on a straight line which is perpendicular to the straight line on which the openings 20, 21 of the reinforcement portion 18 are arranged.

Each reinforcement portion 18 is connected with the central portion 12 by a transition portion 22 which adjoins the corresponding shorter outer edge in a region between the central longitudinal axis of the central portion 12 and the fastening portion 14. Adjoining each of the shorter outer edges are therefore a fastening portion 14, two transition portions 22 and a further fastening portion 14, the two fastening portions together occupying approximately two thirds of the length of the corresponding shorter outer edge.

Figure 10:
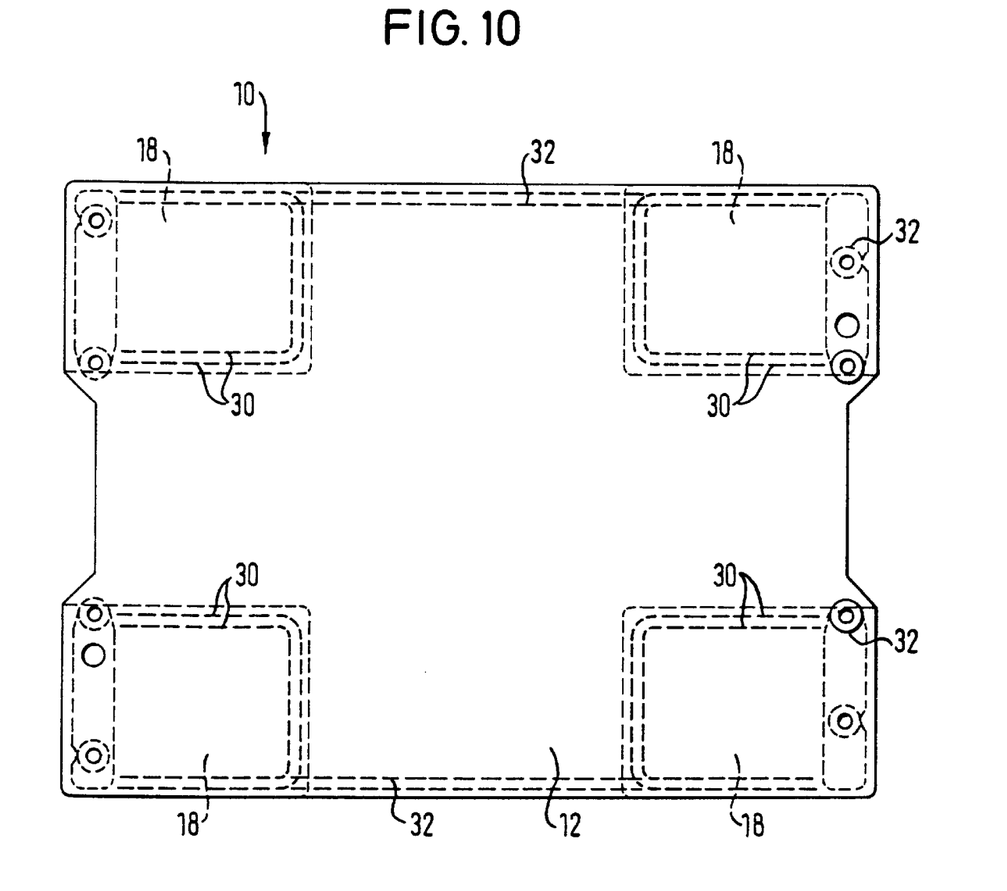
FIG. 10 shows in a developed illustration the fabric piece of FIG. 11.
Figure 11:
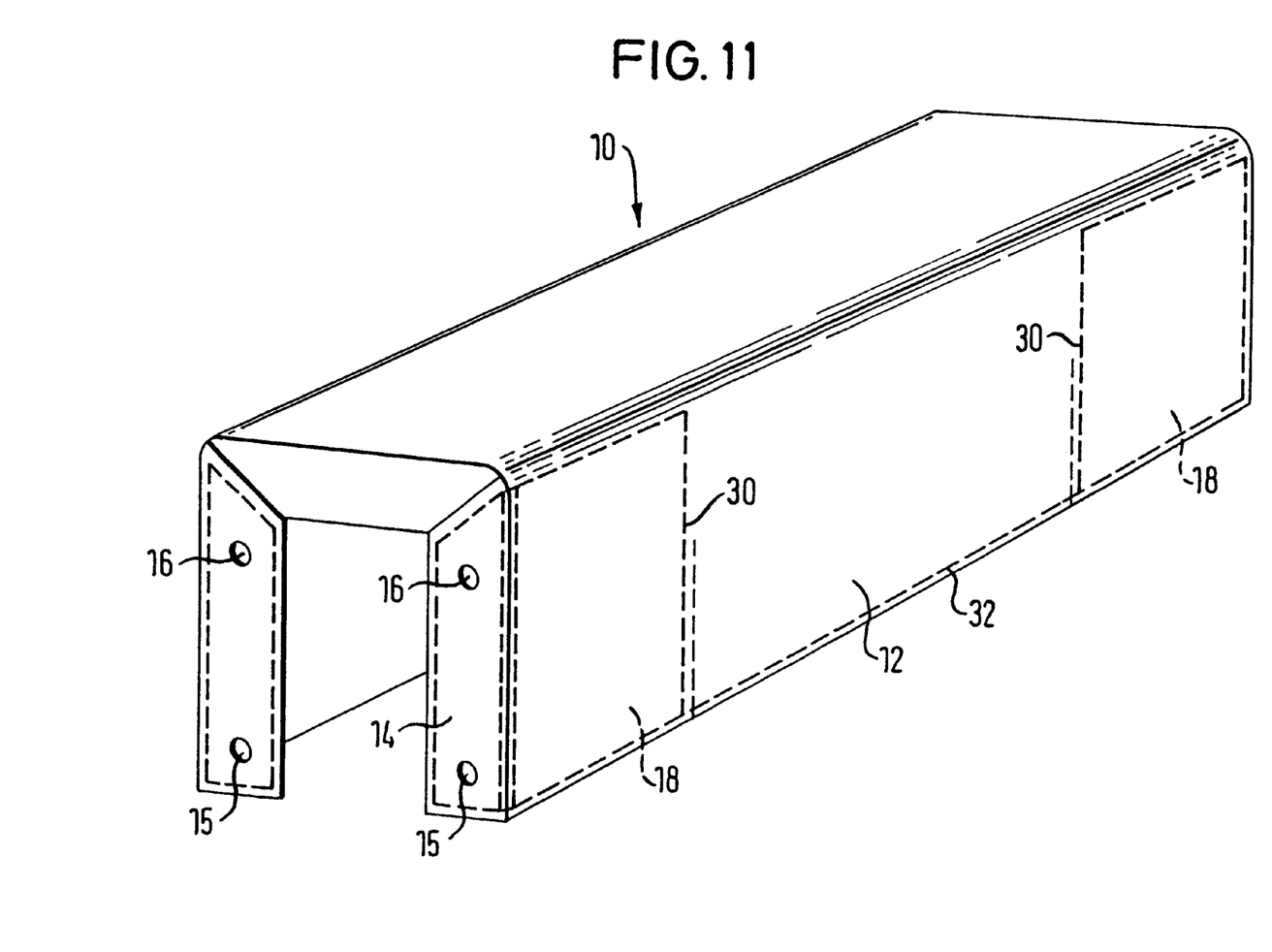
FIG. 11 shows in a perspective view the fabric piece of FIG. 9 in a sewn, three-dimensional state.

In FIG. 11 the fabric piece 10 is shown in a three-dimensional state, sewn together. This is obtained starting from the two-dimensional blank, shown in FIG. 9, in the following manner: The reinforcement portions 18 are pushed onto the side of the central portion 12, which is later to form the inner face of the fabric piece, and are turned such that the opening 21 of the reinforcement piece 18 coincides with the opening 16 of the fastening portion 14 and the opening 20 of the reinforcement portion coincides with the opening 15 of the fastening portion. For this purpose, the reinforcement portions 18 must be turned through approximately 90° about a point which lies in the region of the connection portion 22, and also must be folded likewise through approximately 90° around an edge which is situated in the region of the connection portion 22. This state is shown in FIG. 10, in fact projected into a plane. If the reinforcement portions 18 are then sewn with the fastening portions 14 and the central portion 12, in FIG. 11 the approximately trough-shaped form (shown turned over here) is produced, in which the central portion 12 forms the two side walls and the base of the trough. The fastening portions 14 form a part of the end faces of the trough, a passage remaining between the fastening portions which lie opposite each other. In FIGS. 10 and 11, seams by means of which the reinforcement portions 18 are connected with the fastening portion 14 and the central portion 12, are given the reference number 30. Seams which only serve to reinforce the outer edge or the openings 15, 16, 20, 21 are given the reference number 32.

Figure 12:
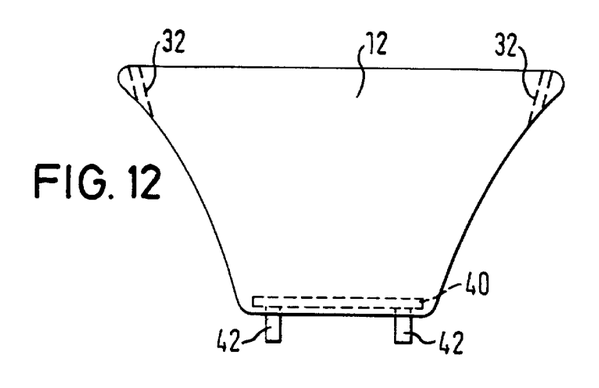
FIG. 12 shows in a first side view the fabric piece of FIG. 10 fastened on a holding frame.
Figure 13:
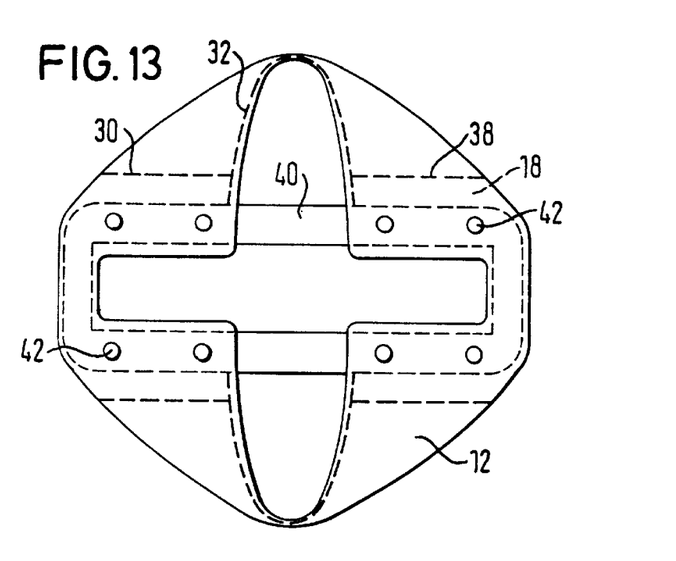
FIG. 13 shows in a bottom view the holding frame with the fabric piece of FIG. 10 fastened thereon.
Figure 14:
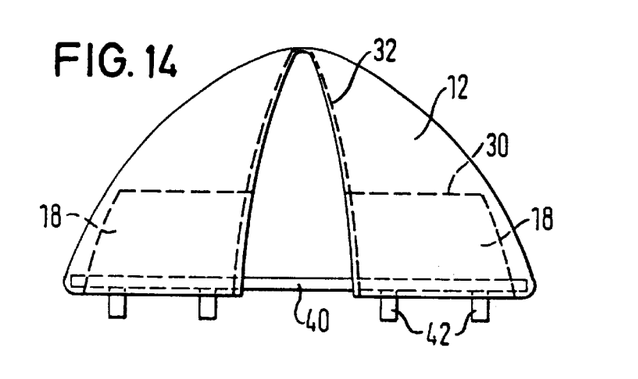
FIG. 14 shows in a second side view the fabric piece of FIG. 10 fastened to the holding frame.

In FIGS. 12 to 14, the finished, sewn-together fabric piece 12 is shown, which is arranged on a holding frame 40. The holding frame serves to secure a gas bag to the housing of the gas bag module. Fastening bolts 42 inset in the holding frame 40 serve to do this, which bolts 42 pass through the openings 15, 16, 20, 21.

When the fabric piece 12 is fastened to the holding frame 40, the fastening portions 14 are situated in one and the same plane. The part of the central portion 12 which previously represented the base of the trough formed by the central portion now extends starting from one end face of the frame in an arc to the other end face. The longer outer edges of the central portion 12 extend approximately in the form of a half ellipse starting from the corresponding longitudinal side of the holding frame.

The fabric piece 10 therefore forms a pre-chamber over the holding frame 40. Compressed gas which flows in through the holding frame 40 into this pre-chamber, emerges from the pre-chamber through two outlet openings which are each formed between the holding frame and one of the longer outer edges of the central portion. In this way, the outflow direction of the compressed gas is provided.

What is claimed is:

1. A gas bag for a vehicle occupant restraint system, said gas bag comprising:
    an inflation opening,
    a fabric piece arranged in the interior of said gas bag opposite said inflation opening and defining a volume for compressed gas introduced into said gas bag through said inflation opening, said fabric piece forming at least one outflow opening for said compressed gas, said outflow opening defining a gas exit area affected by said compressed gas flowing through said outflow opening, said fabric piece including first and second limiting straps arranged in the interior of said gas bag and outside of said gas exit area, said first and second limiting straps being connected with said fabric piece, said first and second limiting straps being constructed in one piece with said fabric piece, said first and second limiting straps and said fabric piece consisting of a fabric blank, said first and second limiting straps being constructed on opposite sides of said fabric piece, and first and second reinforcement regions, said first reinforcement region being located between said first limiting strap and said fabric piece, said second reinforcement region being located between said second limiting strap and said fabric piece, said first and second reinforcement regions being extensions of said fabric blank, each of said first and second reinforcement regions being provided with an opening, said openings having dimensions corresponding to dimensions of said inflation opening, said first and second reinforcement regions being located adjacent to said inflation opening of said gas bag so that said reinforcement openings coincide with said inflation opening.

2. The gas bag of claim 1, wherein an opening is located between said first reinforcement region and said fabric piece, for receiving one of said first and second limiting straps for passage therethrough.

* * * * *

UNITED STATES PATENT AND TRADEMARK OFFICE
CERTIFICATE OF CORRECTION

PATENT NO.    : 6,371,509 B1
DATED         : April 16, 2002
INVENTOR(S)   : Norbert Ellerbrok et al.

It is certified that error appears in the above-identified patent and that said Letters Patent is hereby corrected as shown below:

Column 4,
Lines 64 and 67, after "fabric", change "piece" to -- member --.

Column 5,
Line 4, after "fabric", change "piece" to -- member --.
Line 6, delete "area", delete "said first and second limiting straps being connected with said fabric piece".
Lines 9 and 10, after "fabric" change "piece" to -- member --.
Line 13, after ", and", change "piece" to -- member --.
Line 16, after "fabric" change "piece" to -- member --.

Column 6,
Line 2, after "fabric" change "piece" to -- member --.
Line 12, after "fabric" change "piece" to -- member --.

Signed and Sealed this

First Day of April, 2003

JAMES E. ROGAN
*Director of the United States Patent and Trademark Office*